(12) United States Patent
Choi et al.

(10) Patent No.: US 12,301,710 B2
(45) Date of Patent: May 13, 2025

(54) METHOD AND APPARATUS FOR KEY RELAY CONTROL BASED ON SOFTWARE DEFINED NETWORKING IN QUANTUM KEY DISTRIBUTION NETWORK

(71) Applicant: ELECTRONICS AND TELECOMMUNICATIONS RESEARCH INSTITUTE, Daejeon (KR)

(72) Inventors: Tae Sang Choi, Daejeon (KR); Jeong Yun Kim, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 500 days.

(21) Appl. No.: 17/535,860

(22) Filed: Nov. 26, 2021

(65) Prior Publication Data
US 2022/0360435 A1    Nov. 10, 2022

(30) Foreign Application Priority Data

May 10, 2021  (KR) .......... 10-2021-0059933
Nov. 8, 2021  (KR) .......... 10-2021-0152527

(51) Int. Cl.
H04L 9/08    (2006.01)

(52) U.S. Cl.
CPC .......... H04L 9/0855 (2013.01); H04L 9/0827 (2013.01); H04L 9/0836 (2013.01)

(58) Field of Classification Search
CPC ... H04L 9/0852; H04L 9/0858; H04L 9/0855; H04L 63/061; H04L 9/083; H04L 9/0822;
(Continued)

(56) References Cited

U.S. PATENT DOCUMENTS

| | | | | |
|---|---|---|---|---|
| 5,764,765 A | * | 6/1998 | Phoenix | H04L 9/0858 380/256 |
| 6,748,083 B2 | * | 6/2004 | Hughes | H04L 9/0858 380/278 |

(Continued)

FOREIGN PATENT DOCUMENTS

| | | |
|---|---|---|
| KR | 10-2019-0073520 A | 6/2019 |
| KR | 10-2021-0081178 A | 7/2021 |

OTHER PUBLICATIONS

ITU-T, "Quantum key distribution networks—Control and management", Series Y: Global Information Infrastructure, Internet Protocol Aspects, Next-Generation Networks, Internet of Things and Smart Cities, International Telecommunications Union (ITU), Sep. 2020,Y.3804.

(Continued)

Primary Examiner — Sharif E Ullah
(74) Attorney, Agent, or Firm — Rabin & Berdo, P.C.

(57) ABSTRACT

The present disclosure relates to a method and apparatus for key relay control based on software-defined networking in a quantum key distribution network. A method of controlling key relay in a quantum key distribution network (QKDN) according to an embodiment of the present disclosure includes: receiving, by a first control entity, a key relay route request from a key management (KM) layer; determining, by the first control entity, whether or not key relay is associated with a plurality of resource groups; and, transmitting a key relay route request from the first control entity to a second control entity, when key relay is associated with the plurality of resource groups, wherein key relay route information produced by the second control entity may be provided to the KM layer.

19 Claims, 5 Drawing Sheets

(58) Field of Classification Search
CPC ....... H04L 9/3226; H04L 9/0891; H04L 9/14;
H04L 9/0827; H04L 2209/24; H04L 9/08;
H04L 9/0819; H04L 9/088; H04L 9/0869;
H04L 9/085; H04W 12/041; H04W
12/0431; H04W 12/0433; H04W 12/04;
H04W 12/61; H04W 12/63; H04W 12/71;
G06F 21/31; G06F 21/44; G06F 7/588;
G06F 21/72; G06F 21/86
USPC ........ 713/171, 150, 163, 181; 726/2, 21, 36;
380/255, 264, 276
See application file for complete search history.

(56) References Cited

U.S. PATENT DOCUMENTS

| | | | | |
|---|---|---|---|---|
| 7,437,081 | B2* | 10/2008 | Mitchell | H04B 10/70 398/154 |
| 8,855,316 | B2* | 10/2014 | Wiseman | H04L 9/0855 380/278 |
| 9,960,465 | B2* | 5/2018 | Dudley | H01M 50/204 |
| 10,057,058 | B2* | 8/2018 | Murakami | H04L 9/0858 |
| 10,958,428 | B2 | 3/2021 | Hong et al. | |
| 2005/0138352 | A1* | 6/2005 | Gauvreau | H04L 9/3247 713/153 |
| 2005/0221759 | A1* | 10/2005 | Spadafora | G08G 1/093 455/39 |
| 2007/0065154 | A1* | 3/2007 | Luo | H04J 14/0282 398/141 |
| 2007/0076884 | A1* | 4/2007 | Wellbrock | H04L 9/0855 380/263 |
| 2007/0195774 | A1* | 8/2007 | Sherman | H04L 69/16 370/392 |
| 2011/0206204 | A1* | 8/2011 | Sychev | H04J 14/06 380/256 |
| 2011/0213979 | A1* | 9/2011 | Wiseman | H04L 9/0844 713/171 |
| 2014/0010234 | A1* | 1/2014 | Patel | H04L 45/74 370/392 |
| 2014/0068765 | A1* | 3/2014 | Choi | H04L 63/1416 726/23 |
| 2014/0133652 | A1* | 5/2014 | Oshida | H04L 9/0897 380/255 |
| 2016/0155327 | A1* | 6/2016 | Schlienz | B61L 29/18 340/907 |
| 2016/0241396 | A1* | 8/2016 | Fu | H04L 9/0836 |
| 2016/0359626 | A1* | 12/2016 | Fu | H04L 9/0858 |
| 2016/0366094 | A1* | 12/2016 | Mason | H04L 61/5038 |
| 2017/0214525 | A1* | 7/2017 | Zhao | H04W 12/0431 |
| 2017/0230173 | A1* | 8/2017 | Choi | H04L 9/0861 |
| 2017/0338952 | A1* | 11/2017 | Hong | H04L 9/083 |
| 2018/0176091 | A1* | 6/2018 | Yoon | H04L 43/0888 |
| 2019/0036821 | A1* | 1/2019 | Levy | G06F 12/0868 |
| 2019/0260581 | A1* | 8/2019 | Su | H04L 9/08 |
| 2019/0349392 | A1* | 11/2019 | Wetterwald | H04L 43/0852 |
| 2020/0084222 | A1* | 3/2020 | William | H04L 63/12 |
| 2022/0360434 | A1* | 11/2022 | Choi | H04L 63/061 |

OTHER PUBLICATIONS

Y. Zhao et al., "Draft Recommendation ITU-T Y. QKDN_SDNC: Quantum Key Distribution Networks—Software Defined Networking Control", Q16/13 rapporteur meeting in Geneva and 2020 SG13RGM Q16/13 meeting, International Telecommunications Union (ITU), Mar. 1-12, 2021, SG13-TD550/WP3.

\* cited by examiner

METHOD AND APPARATUS FOR KEY RELAY CONTROL BASED ON SOFTWARE DEFINED NETWORKING IN QUANTUM KEY DISTRIBUTION NETWORK

CROSS REFERENCE TO RELATED APPLICATION

The present application claims priority to a K.R. application 10-2021-0059933, filed May 10, 2021, and a K.R. application 10-2021-0152527, filed Nov. 8, 2021, the entire contents of which are incorporated herein for all purposes by this reference.

BACKGROUND OF THE INVENTION

Field of the Invention

The present disclosure relates to software-defined networking in a quantum key distribution network and, more particularly, to a method and apparatus for key relay control based on software-defined networking in a quantum key distribution network.

Description of the Related Art

Quantum key distribution (QKD) is a technology of distributing and sharing quantum keys between remote users based on quantum physics. This technology is capable of preventing an attacker from wiretapping and of enabling a sender and a receiver to share a quantum key. For example, QKD may be defined as a procedure or method of creating and distributing a symmetric encryption key with information-theoretic security based on quantum information theory.

Quantum key distribution network (QKDN) is a technology of applying a QKD cryptosystem to a general communication network. For example, QKDN may be defined as a network including 2 or more QKD nodes which are connected through QKD links. QKDN may support key sharing through key relay for QKD nodes that are not directly connected by a QKD link. Specifically, as a QKD system operates only on a point-to-point link, the link distance is fundamentally limited by photon loss, while QKDN may support network redundancy for stable operation and provide communication based on quantum key encryption to remote users through key relay and rerouting.

For the control based on software-defined networking (SDN) in QKDN, the recent discussions cover such issues as requirements, functional structures, reference points, hierarchical SDN controller, an overall operating procedure, controllable elements, security considerations and the like. SDN may be defined as a set of techniques of enabling direct programming, orchestration, control and management of network resources and may design, deliver and operate a network service in a dynamic and scalable manner.

However, no concrete scheme has been provided for key relay control and key relay rerouting control based on SDN control in QKDN.

SUMMARY

The present disclosure is technically directed to provide a new operation procedure of SDN control in QKDN.

The present disclosure is further technically directed to provide a new method and apparatus for key relay control through SDN control in QKDN.

The present disclosure is further technically directed to provide a new method and apparatus for key relay rerouting control through SDN control in QKDN.

The technical objects of the present disclosure are not limited to the above-mentioned technical objects, and other technical objects that are not mentioned will be clearly understood by those skilled in the art through the following descriptions.

A method of controlling key relay in a quantum key distribution network (QKDN) according to an embodiment of the present disclosure includes: receiving, by a first control entity, a key relay route request from a key management (KM) layer; determining, by the first control entity, whether or not key relay is associated with a plurality of resource groups due to the scale of the QKDN which consists of multiple sub-QKDNs; and, transmitting a key relay route request from the first control entity to a second control entity, when key relay is associated with the plurality of resource groups due to the scale of the QKDN which consists of multiple sub-QKDNs, wherein key relay route information produced by the second control entity provides to the KM layer.

A controller for controlling key relay in a quantum key distribution network (QKDN) according to another aspect of the present disclosure includes N (N is an integer equal to or greater than 1) control entities, wherein a first control entity includes a key relay route request management unit, which is configured to: receive a key relay route request from a key management (KM) layer; determine whether or not key relay is associated with a plurality of resource groups due to the scale of the QKDN which consists of multiple sub-QKDNs; transmit a key relay route request to a second control entity and further transmit a key relay route request up to a $N^{th}$ control entity, when the key relay is associated with the plurality of resource groups due to the scale of the QKDN which consists of multiple sub-QKDNs, and wherein key relay route information, which is produced by a route information production unit included in the $N^{th}$ control entity, may be provided from the $N^{th}$ control entity to the KM layer.

According to the present disclosure, as a new operation procedure of SDN control in QKDN is provided, new and efficient SDN-based control, which satisfies control requirements of QKDN such as key relay routing control, may be provided through a centralized control model, separation of control plane and forward plane and an open interface for applications.

Also, according to the present disclosure, as a new method and apparatus for key relay control and key relay rerouting control based on SDN control in QKDN are provided, optimal key relay routing information may be efficiently determined by comprehensively considering information of entities constituting QKDN.

Effects obtained in the present disclosure are not limited to the above-mentioned effects, and other effects not mentioned above may be clearly understood by those skilled in the art from the following description.

DETAILED DESCRIPTION

Figure 1:
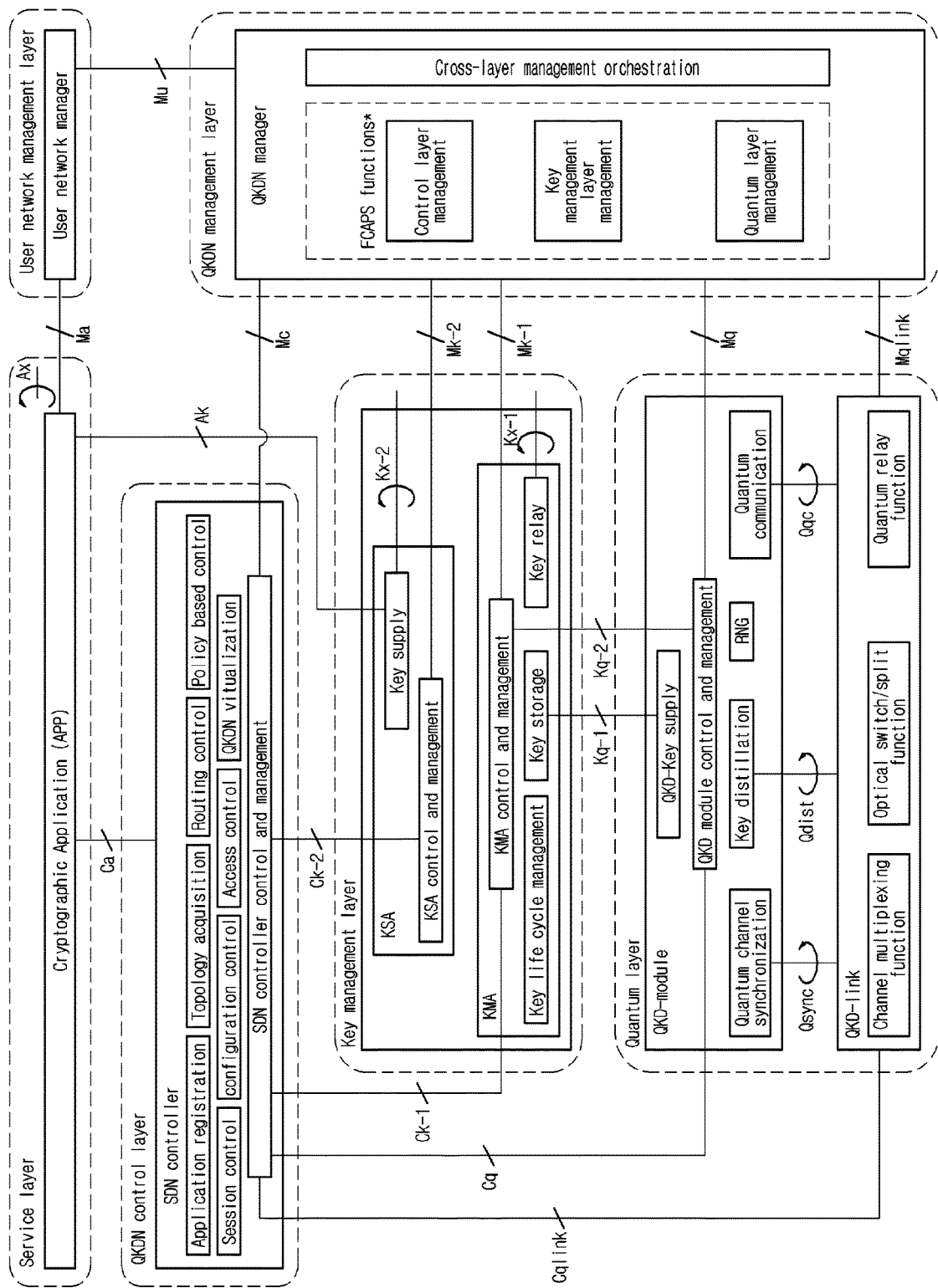
FIG. 1 is a view illustrating a functional structure of SDN control in QKDN to which the present disclosure is applicable.

Hereinafter, embodiments of the present disclosure will be described in detail with reference to the accompanying drawings, which will be easily implemented by those skilled in the art. However, the present disclosure may be embodied in many different forms and is not limited to the exemplary embodiments described herein.

In the following description of the embodiments of the present disclosure, a detailed description of known configurations or functions incorporated herein will be omitted when it may make the subject matter of the present disclosure rather unclear. In addition, parts not related to the description of the present disclosure in the drawings are omitted, and like parts are denoted by similar reference numerals.

In the present disclosure, when a component is referred to as being "linked", "coupled", or "connected" to another component, it is understood that not only a direct connection relationship but also an indirect connection relationship through an intermediate component may also be included. In addition, the term "comprise" or "have" in the present disclosure specifies the presence of a feature, a step, an operation, an element and/or a component mentioned herein but does not exclude the presence or addition of one or more additional features, steps, operations, elements, components and/or a combination thereof.

In the present disclosure, the terms "first" "second" and the like are used only to distinguish one component from another not to restrict components and do not limit the order or importance of components, etc. unless specifically stated otherwise. Accordingly, within the scope of the present disclosure, a first component in one embodiment may be referred to as a second component in another embodiment, and similarly a second component in one embodiment may be referred to as a first component in another embodiment.

In the present disclosure, components that are distinguished from each other are intended to clearly illustrate respective features. However, it does not necessarily mean that the components are separate. That is, a plurality of components may be integrated into one hardware or software unit, or a single component may be distributed into a plurality of hardware or software units. Thus, unless otherwise noted, such integrated or distributed embodiments are also included within the scope of the present disclosure.

The various embodiments of the disclosure are not intended to list all the possible combinations of components but are intended to illustrate representative aspects of the disclosure, and some or all the components described in the various embodiments may be applied independently or in a combination of two or more. That is, the components described in the various embodiments of the present disclosure are not necessarily essential components, and some may be optional components. Accordingly, embodiments consisting of a subset of the components described in one embodiment are also included within the scope of the present disclosure. Also, an embodiment that includes other components in addition to the components described in the various embodiments is also included in the scope of the present disclosure.

Although the exemplary methods of the present disclosure are represented by a series of acts for clarity of explanation, they are not intended to limit the order in which the steps are performed, and if necessary, each step may be performed simultaneously or in a different order. In addition, in order to implement a method according to the present disclosure, the illustrative steps may include an additional step or exclude some steps while including the remaining steps. Alternatively, some steps may be excluded while additional steps are included.

The terminology used herein is intended to describe particular embodiments but not to limit the claims. As used in the descriptions of embodiments and the appended claims, singular expressions are intended to include plural expressions unless clearly otherwise indicated by the context. In addition, in the present disclosure, the term "and/or" may refer to one of relevant items listed herein or may refer to and include any two or more possible combinations thereof. In addition, in the present disclosure, "I" has the same meaning as "and/or", unless stated otherwise.

FIG. 1 is a view illustrating a functional structure of SDN control in QKDN to which the present disclosure is applicable.

FIG. 1 illustrates an example functional structure of SDN control based on a predefined structure of QKDN.

A QKDN structure may include various entities such as a quantum layer, key management (KM) layer, a QKDN control layer, a service layer and a QKDN management layer.

The functional elements of a quantum layer may include a QKD-link and a QKD-module and may be enabled to easily communicate with a SDN controller. The parameters of a QKD-link and a QKD-module such as a quantum key creation rate, transmission power and reception power may be adjusted by a SDN controller of a QKDN control layer.

As illustrated in FIG. 1, the functions of a QKD-link may include channel multiplexing, optical switch/separation, quantum relay and the like. The functions of a QKD-module may include quantum channel synchronization, key distillation, random number generation, quantum communication, QKD-key provision and the like.

The functional elements of a key management layer may include a key management agent (KMA) and a key supply agent (KSA) and may exchange a message for control and management with a SDN controller. The SDN technology enables a virtual quantum key pool (VQKP) to be configured in QKDN. Herein, the VQKP may be defined as a virtual QKD-key storage entity for any pair of quantum nodes and may improve quantum key management.

As illustrated in FIG. 1, the functions of a KMA may include key life management, key storage, key relay and the like. The functions of a KSA may include key supply.

The functional element of a QKDN control layer may include a SDN controller. The SDN controller may control various resources for ensuring the security, safety, efficiency and robustness of QKDN operation. Unlike an existing QKDN controller, the SDN controller may have an interface with an upper layer like a service layer and a control layer. The SDN controller may enable fast service provisioning for an application of QKDN through an interface for a cryptographic application of a service layer.

As illustrated in FIG. 1, the functions of a SDN controller may include application registration, topology acquisition, routing control, policy-based on control, session control, setting control, access control, QKDN virtualization and the like.

As described below, a QKDN control layer may include N (N is an integer equal to or greater than 1) SDN control entities. When the QKDN control layer includes a plurality of SDN control entities, the plurality of SDN control entities may be distinguished by groups of resources (e.g., targets, regions, subnetworks, functions) which are controlled by respective entities. In addition, the plurality of SDN control entities may have a hierarchical structure with upper/lower relations. For example, a plurality of lower control entities may correspond to one upper control entity, or a plurality of lower control entities may be replaced by one upper control entity.

Hereinafter, when a QKDN control layer includes a plurality of SDN control entities, it is assumed that each SDN control entity controls a separate resource group. For example, a first control entity may be assigned to or control a first resource group, and a second control entity may be assigned to or control a second resource group. In addition, different resource groups may commonly include all or some resources. For example, the first resource group may include a common resource(s) with the second resource group, the first resource group may be configured as a subset of the second resource group, or the first resource group and the second resource group may not include any common resource.

A cryptographic application of a service layer may utilize a pair of shared keys, which are provided by a QKDN, and perform encoded communication between remote parties. A cryptographic application may be disclosed and provided by a SDN controller and through an interface with the SDN controller. Three representative cryptographic applications of a service layer are a point-to-point application, a point-to-multipoint application and a multipoint-to-multipoint application.

The elements of a QKDN management layer may obtain setting and management information through communication with a SDN controller. As illustrated in FIG. 1, the functions of a QKDN manager may include not only the functions of fault, configuration, accounting, performance and security (FACPS) but also control layer management, key management layer management, quantum layer management, and cross-layer management orchestration.

Information exchange between layers (or functional elements or entities) in the above-described QKDN structure may be performed through a logical interface between layers/functional elements/entities, which is defined as a reference point. For example, a reference point between a SDN controller of a QKDN control layer and a KM control and management function of a KM layer may be defined as a difference. Reference point Ck may take charge of communicating control information between the SDN controller and the KM control and management function. Specifically, a reference point between the QKDN control layer and a KMA control and management function may be defined as Ck-1, and a reference point between the QKDN control layer and a KSA control and management function may be defined as Ck-2.

Figure 2:
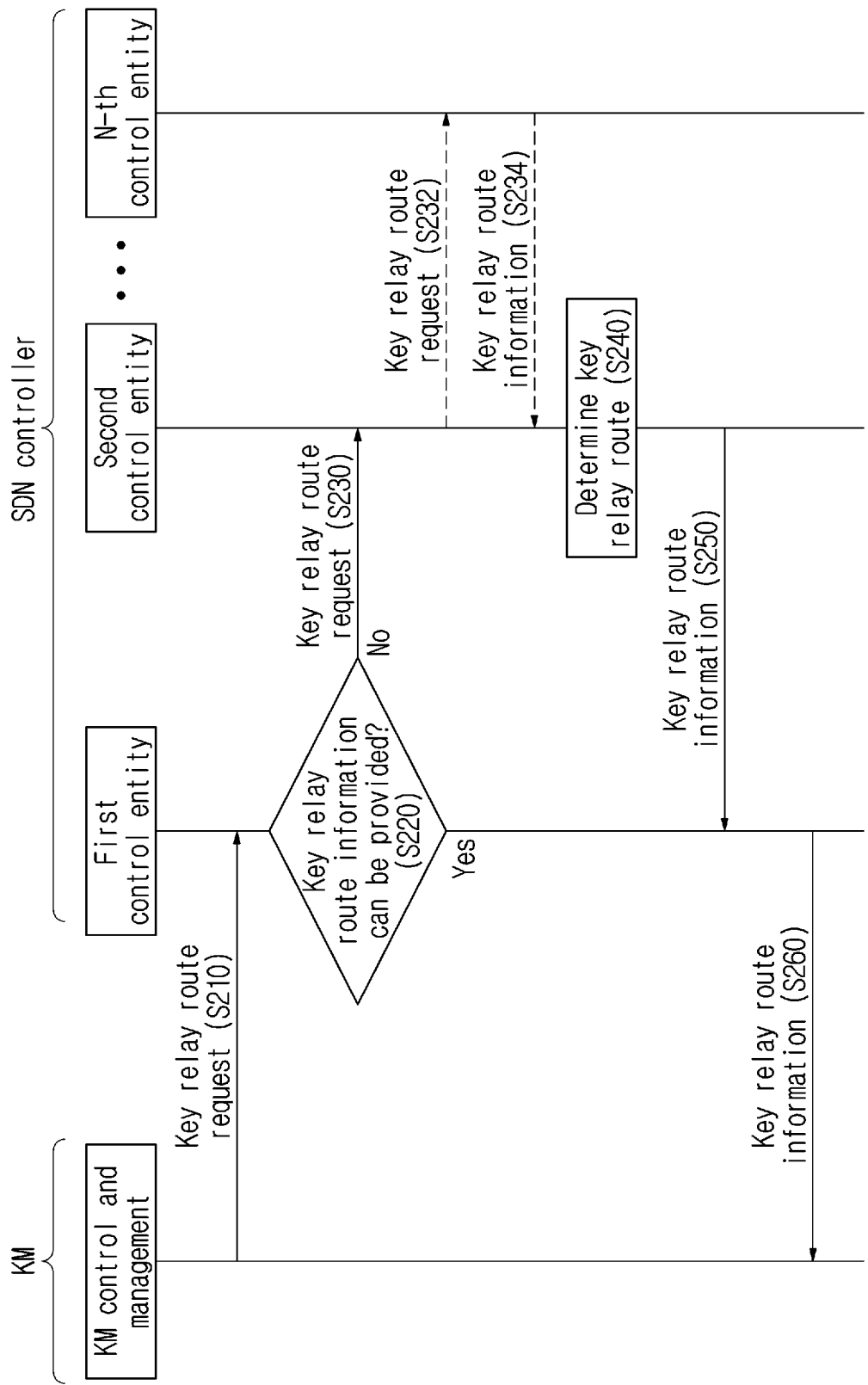
FIG. 2 is a view for explaining a key relay control procedure including SDN control according to an embodiment of the present disclosure.

FIG. 2 is a view for explaining a key relay control procedure including SDN control according to an embodiment of the present disclosure.

At step S210, a SDN controller (or a first control entity of the SDN controller) may receive a request for key relay route from a KM layer.

A determination of key relay may be made by the SDN controller based on a request from a cryptographic application or the KM layer. For example, the request for key relay route from the KM layer may be based on a request from the cryptographic application. An example procedure requested by the cryptographic application may include a procedure of key request, relay and supply. That is, as the SDN controller knows every key resource status of each node, the cryptographic application of a user network may transmit IT-security key request information to the SDN controller of QKDN.

Although not illustrated in FIG. 2, in case no key relay is needed, the KM layer may supply a key directly to the cryptographic application. That is, the KM layer may push up a key to the requesting cryptographic application.

From the perspective of the SDN controller, a subsequent operation may be performed after receiving the request for key relay route from the KM layer, and whether or not the request originates from the cryptographic application may not be identified.

At step S220, the first control entity of the SDN controller may determine whether or not it is capable of providing key relay route information.

When the first control entity is capable of providing the key relay route information on its own (that is, without request/response of another control entity) (Yes), the first control entity may determine/produce the key relay route information and provide the determined/produced key relay route information to the KM layer (S260).

When the first control entity is incapable of providing the key relay route information on its own (No), at step S230, it may transmit a key relay route request to a second control entity.

When the second control entity is capable of providing the key relay route information, the second control entity may determine/produce a key relay route (S240) and provide the determined/produced key relay route information to the KM layer via the first control entity (S250) or on its own (S260).

When the second control entity is incapable of providing the key relay route information, it may transmit a key relay route request to a third control entity (S232).

When the third control entity is capable of providing the key relay route information, the third control entity may provide the key relay route information to the KM layer either via the first control entity and/or the second control entity (S234, S250) or on its own (S260).

Thus, each of multiple SDN control entities in the QKDN control layer may determine whether or not to request a key relay route to another control entity, based on whether or not it is capable of providing key relay route information. Such a process may be performed sequentially from the first control entity to a N-th control entity, and one control entity may transmit a key relay route request to a specific control entity.

In addition, whether or not each control entity is capable of providing key relay route information may be determined based on whether or not key relay is associated with a plurality of resource groups. As described above, a plurality of resource groups may be defined as groups based on multiple targets, regions, sub-networks and functions which are distinguished. Specifically, when each control entity is capable of determining/producing a key relay route based on a resource group with which it is associated, the each control entity may determine that it is capable of providing key relay route information on its own. Alternatively, when each control entity needs to determine/produce a key relay route based on a different resource group from a resource group with which it is associated, the each control entity may determine that it is incapable of providing key relay route information on its own. That is, each control entity may determine whether or not it is capable of providing key relay route information, according to whether key relay is associated with a single resource group or is associated with a plurality of resource groups.

According to an embodiment to which the present disclosure is applicable, the first control entity may include a session control function and determine whether or not there is a session between a source (or originator) QKD node and a destination QKD node (S220), and when there is no session, the first control entity may determine that it is incapable of determining/producing a key relay route on its own (No). In this case, the first control entity may request the key relay route to the second control entity including a routing control function (S230). When the second control entity is incapable of determining/producing key relay route information on its own, the second control entity may request key relay route or setting information to the third control entity including a setting control function (S232). The third control entity may determine/produce the key relay route information, or the third control entity may provide setting information, which is necessary for the second control entity to determine/produce the key relay route information, to the second control entity (S234). In FIG. 2, the steps marked in dotted lines may be performed only when necessary and may be skipped. The second control entity may evaluate/determine an optimal key relay route based on information provided by the third control entity (S240). The second control entity may provide the key relay route information to the first control entity (S250), and the first control entity may provide the key relay route information to the KM layer (S260).

Distinguishing the first to N control entities functionally is merely illustrative and not limits the scope of the present disclosure. That is, as described above, according to resource groups assigned to each of a plurality of SDN control entities included in the QKDN control layer, each control entity may forward a key relay route request to another control entity based on whether or not it is capable of determining the key relay route information on its own. As a result, at step S260, the key relay route information may be transmitted from the SDN controller (e.g., the first control entity, the second control entity, . . . or the N-th control entity) to the KM layer. On the key relay route provided from the SDN controller, the KM layer may perform key relay. In addition, the KM layer may supply a key to the cryptographic application.

According to the example described with reference to FIG. 2, the SDN controller may determine necessity of key relay or a key relay route request. When the key relay or the key relay route request is needed for service provisioning, the SDN controller may determine key relay routing information. Based on the key relay routing information, the KM layer may begin a key relay procedure between a source/originator QKD node and a destination QKD node and perform key relay according to the control of the SDN controller.

The example procedure described with reference to FIG. 2 may support a case of generating a key, for which key relay is required, in order to enable the KM layer to be prepared for a future key request of a cryptographic application.

Figure 3:
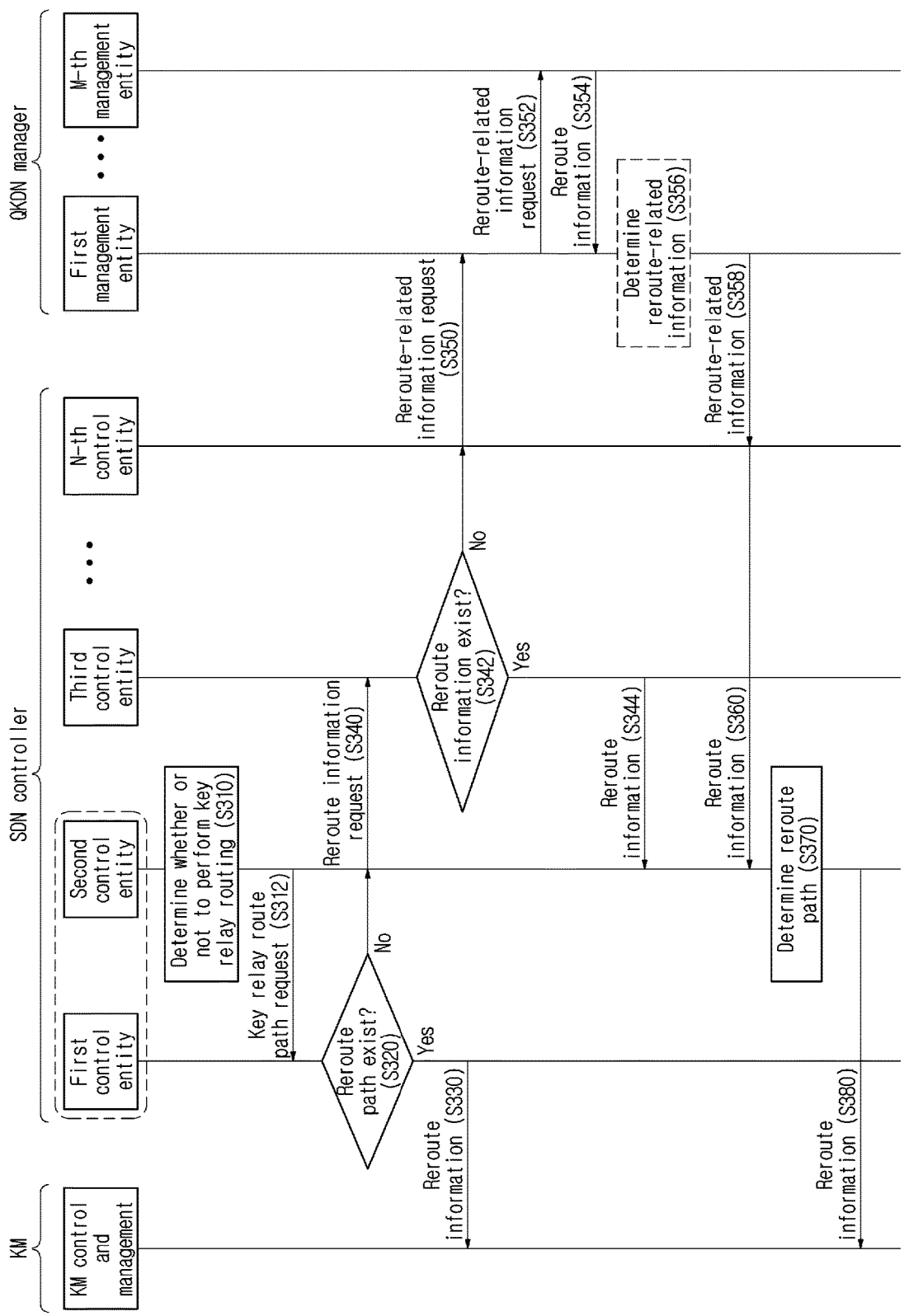
FIG. 3 is a view for explaining a key relay rerouting procedure including SDN control according to an embodiment of the present disclosure.

FIG. 3 is a view for explaining a key relay rerouting procedure including SDN control according to an embodiment of the present disclosure.

At step S310, a second control entity of a SDN controller may determine whether or not to reroute key relay. Whether or not to reroute key relay may be determined based on various factors. For example, the factors may include lowering of a key generation rate below a predetermined threshold (or lowering of a residual key amount below a predetermined threshold), a quantum channel failure (or a quantum bit error rate (QBER) exceeding a predetermined threshold), fault of a KM layer at a relay node(s) or at a QKD module and the like. In addition, the SDN controller may receive the factors as alarm information from a quantum layer (QL) and/or the KM layer.

At step S320, a first control entity may determine whether or not there is a reroute path. For example, the first control entity, which receives a key relay reroute path request (S312) of the second control entity, may determine whether or not there is a reroute path.

When there is a reroute path, the first control entity may provide reroute information to the KM layer (S330).

When there is no reroute path, the first control entity may request reroute information to a third control entity (through the second control entity) (S340).

For example, the presence of a reroute path in the first control entity may correspond to a case that the first control entity is capable of determining reroute information on its own (or a case that key relay rerouting is associated with a single resource group), which is similar to what is described in the example of FIG. 2. In this case, the first control entity may provide reroute information or a reroute path to the KM layer.

Likewise, the absence of a reroute path in the first control entity may correspond to a case that the first control entity is incapable of determining reroute information on its own (or a case that key relay rerouting is associated with a plurality of resource groups), which is similar to what is described in the example of FIG. 2. In this case, reroute information or a reroute path may be determined/produced in a control entity other than the first control entity (e.g., the second control entity or the third control entity), and the determined/produced reroute information/path may be provided to the KM layer.

In the example of FIG. 3, determining whether or not key relay is rerouted (S310) and determining whether or not there is a reroute path (S320) are described to be performed in the second control entity and in the first control entity respectively, but this is merely illustrative and does not limit the scope of the present disclosure. That is, the scope of the present disclosure may include an embodiment in which one control entity of a plurality of SDN control entities included in a QKDN control layer determines whether or not to reroute key relay and whether or not there is a reroute path.

At step S342, when there is reroute information in the third control entity, the information may be forwarded to the second control entity (S344). Accordingly, the second control entity may determine/produce an optimal reroute path based on the reroute information (S370) and provide the determined/produced reroute path to the KM layer (through the first control entity) (S380).

When there is no reroute path in the third control entity, reroute-related information may be requested to a management entity of a QKDN manager (through N-th control entity) (S350). For example, the reroute-related information may include supporting information (e.g., network topology information) for determining reroute information.

The QKDN manager may M management entities (M is an integer equal to or greater than 1). For example, a management entity (e.g., a first management entity), which receives a request of reroute-related information, and a management entity (e.g., M-th management entity), which has the reroute-related information, may be different. In this case, the first management entity may request the reroute-related information to the M-th management entity (S352) and receive the reroute-related information from the M-th management entity (S354). Accordingly, the first management entity may analyze the reroute-related information and select/determine the reroute-related information like suitable key relay topology information (S356). The reroute-related information thus determined may be forwarded to the N-th control entity (S358), and the N-th control entity may determine reroute information based on the reroute-related information and forward the reroute information to the second control entity (S360). In FIG. 3, the steps marked in dotted lines may be performed only when necessary and may be skipped. Accordingly, the second control entity may determine/produce an optimal reroute path based on the reroute information (S370) and provide the determined/produced reroute path to the KM layer (through the first control entity) (S380).

As in the above-described example, when the SDN controller determines that key relay rerouting is necessary, rerouting information may be determined and be provided to the KM layer. Herein, when one control entity has the rerouting information or is capable of determining/producing the rerouting information on its own (e.g., when key relay rerouting is associated with a single resource group), the one control entity may provide the rerouting information to the KM layer without exchange of information with another control entity. Alternatively, when one control entity does not have the rerouting information or is incapable of determining/producing the rerouting information on its own (e.g., when key relay rerouting is associated with a plurality of resource groups), the rerouting information, which is determined in associated with a plurality of control entities through exchange of information with another control entity, may be provided to the KM layer.

Accordingly, on the key relay rerouting route provided by the SDN controller, the KM layer may perform key relay.

According to an example to which the present disclosure is applicable, based on an alarm from another layer (e.g., a residual key amount of KM of relay node(s) lowering below a predetermined threshold, QBER exceeding a predetermined threshold, or a fault detection at KM or QKD module of relay node(s)), the second control entity including a routing control function of the SDN controller may determine that key relay rerouting is necessary (S310). The second control entity may request a key relay rerouting path to the first control entity including a session control function (S312). The second control entity may check whether or not the first control entity has a reroute path that already exists (S320). When there is a reroute path, a reroute path thus produced may be provided to the KM layer, and the KM layer may perform rerouting (S330). When there is no reroute path, the second control entity may request key relay rerouting support information to the third control entity including a setting control function (S340). The third control entity may check whether or not it has every necessary information to produce an optimal rerouting path (S342). When there is reroute information, the third control entity may produce an optimal reroute path based on the information, which it has, and provide the optimal reroute path to the second control entity (S344). When there is no reroute information, the third control entity may request reroute-related/supporting information to the first management entity including the QKDN control and management function of the QKDN manager through an N-th control entity including the SDN controller control and management function of the SDN controller (S350). The first management entity may request reroute-related/supporting information (e.g., network topology information) to an M-th management entity including a cross-layer management and orchestration function (S352), and the M-th management entity may report the requested information to the first management entity (S354). The first management entity may analyze and select matched key relay topology information and other supporting information (S356) and report these pieces of information to an N-th control entity (S358). The N-th control entity may forward the information thus acquired to the second control entity (S360). The second control entity may determine/produce an optimal reroute path based on information which it has or obtains from another entity (S370). The second control entity may provide information on the determined/produced reroute path to the KM layer (S380), and the KM layer may perform key relay on a path which is rerouted accordingly.

In the example above, distinguishing the first to N control entities according to functions is merely illustrative and not limits the scope of the present disclosure. That is, as described above, according to resource groups assigned to each of a plurality of SDN control entities included in the QKDN control layer, each control entity may forward a key relay route request to another control entity based on whether or not it is capable of determining the key relay route information on its own.

Figure 4:
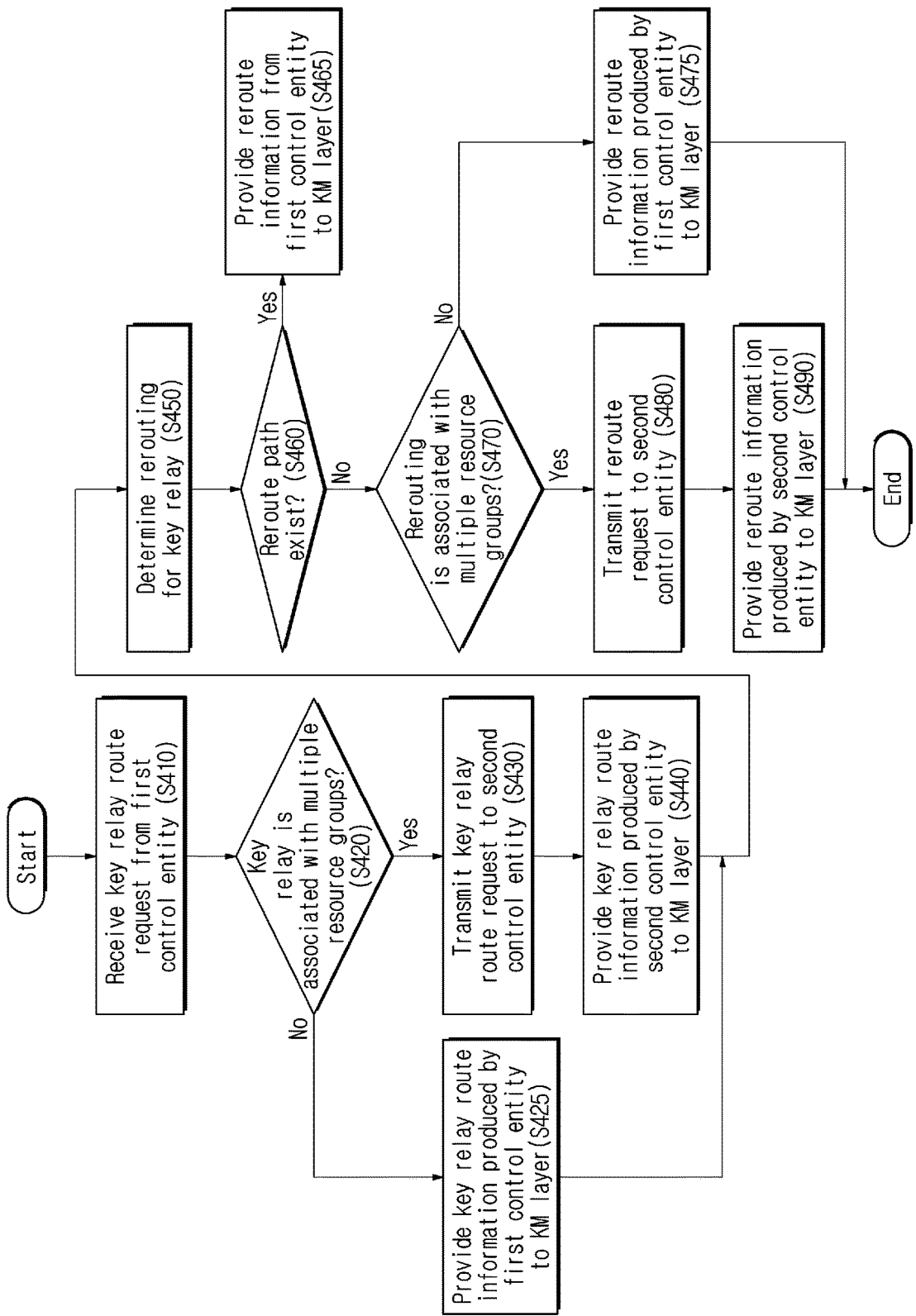
FIG. 4 is a view for explaining a key relay-related operation by a SDN controller in QKDN according to an embodiment of the present disclosure.

FIG. 4 is a view for explaining a key relay-related operation by a SDN controller in QKDN according to an embodiment of the present disclosure.

FIG. 4 shows a key relay/rerouting operation in a first control entity and a second control entity which are included in a QKDN control layer. QKDN may include a quantum layer, a KM layer, a QKDN control layer, a QKDN management layer, and a service layer, the QKDN control layer may include a plurality of SDN control entities, and the service layer may include a cryptographic application.

At step S410, a first control entity may receive a key relay route request from a key management (KM) layer.

For example, the key relay route request from the KM layer may be based on a request from the cryptographic application. When no key relay is needed, the key relay route request from the KM layer is not transmitted to the first control entity, and a key may be supplied from the KM layer to the cryptographic application.

At step S420, the first control entity may determine whether or not key relay is associated with a plurality of resource groups.

For example, the plurality of resource groups may include a first resource group associated with the first control entity and a second resource group associated with the second control entity. In addition, a resource group may be defined based on one or more of target, region, subnetwork and function. For example, the first control entity and the second control entity may have a hierarchical structure.

At step S430, when key relay is associated with a plurality of resource groups, a key relay route request may be transmitted from the first control entity to the second control entity.

At step S440, key relay route information produced by the second control entity may be provided to the KM layer.

At step S425, when key relay is not associated with a plurality of resource groups, key relay route information produced by the first control entity may be provided to the KM layer.

Key relay may be performed on a first key relay route based on key relay route information which is provided at step S425 or at step S440. In addition, a key may be supplied from the KM layer to the cryptographic application.

At step S450, rerouting for key relay may be determined. For example, the first control entity may determine that rerouting is necessary, based on an alarm from a QL and/or a KML (e.g., in case an event associated with a key relay failure on a first key relay route is detected).

At step S460, the first control entity may determine whether or not there is a reroute path.

At step S465, when there is a reroute path, a reroute path/information may be provided from the first control entity to the KM layer.

At step S470, when there is no reroute path, the first control entity is incapable of determining whether or not reroute is associated with a plurality of resource groups.

At step S480, when reroute is associated with a plurality of resource groups, a reroute request may be transmitted from the first control entity to the second control entity.

At step S490, a reroute path/information produced by the second control entity may be provided to the KM layer.

At step S475, when key relay is not associated with a plurality of resource groups, a reroute path/information produced by the first control entity may be provided to the KM layer.

Key relay may be performed/resumed on a second key relay route based on the reroute path/information, which is provided to the KM layer at step S475 or at step S490.

Figure 5:
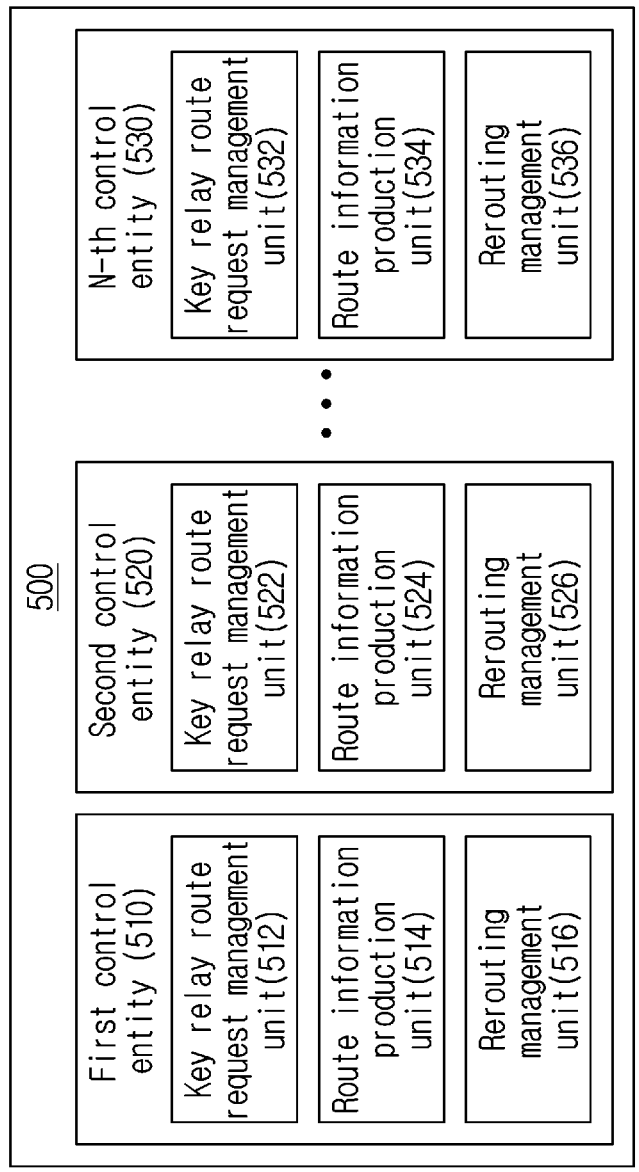
FIG. 5 is a view for explaining a configuration of a SDN controller according to an embodiment of the present disclosure.

FIG. 5 is a view for explaining a structure of a QKDN control layer according to an embodiment of the present disclosure.

A QKDN control layer 500 may include N SDN control entities 510, 520, ..., 530. Each of the control entities 510, 520 and 530 may include key relay route request management units 512, 522 and 532, route information production units 514, 524 and 534 and rerouting management units 516, 526 and 536, respectively.

The key relay route request management unit 512 of the first control entity 510 may process a key relay request received from a KM layer. For example, when receiving the key relay request, the key relay route request management unit 512 may determine whether or not to provide key relay route information (e.g., whether or not key relay is associated with a plurality of resource groups), may forward the key relay route request to another control entity 520, 530 and the like or may transmit route information obtained from the route information production unit 514 to the KM layer.

In addition, when receiving a key relay route request from another control entity 520, 530 and the like, the key relay route request management unit 512 may transmit route information, which is obtained from the route information production unit 514, to the KM layer.

Based on an alarm from the KM layer/quantum layer, the rerouting management unit 516 of the first control entity 510 may determine whether or not to perform key relay rerouting. When rerouting is determined, if the rerouting management unit 516 has a reroute path, the rerouting management unit 516 may transmit the reroute path to the KM layer. When the rerouting management unit 516 has no reroute path, the rerouting management unit 516 may determine whether or not reroute information may be provided (e.g., whether or not rerouting is associated with a plurality of resource groups), forward a reroute request to another control entity 520, 530 and the like or transmit a reroute path/information, which is obtained from the route information production unit 514, to the KM layer.

In addition, when receiving the reroute request from another control entity 520, 530 and the like, the rerouting management unit 516 may transmit a reroute path/information, which is obtained from the route information production unit 514, to the KM layer.

Based on a request/command of the key relay route request management unit 512 and/or the rerouting management unit 516, the route information production unit 514 of the first control entity may produce key relay route information and/or a key relay reroute path/information. The produced key relay route information and/or key relay reroute path/information may be forwarded to the key relay route request management unit 512 and/or the rerouting management unit 516.

As the second control entity 520 and an N-th control entity 530 may also operate in a similar way to the first control entity 510, the duplicate explanation will be skipped.

As the detailed operation of N SDN control entities 510, 520, ... 530 of the QKDN control layer 500 is the same as what is described above, the duplicate explanation will be skipped.

The various embodiments of the present disclosure may be implemented by hardware, firmware, software, or a combination thereof. In the case of hardware implementation, one or more application specific integrated circuits (ASICs), digital signal processors (DSPs), digital signal processing devices (DSPDs), programmable logic devices (PLDs), field programmable gate arrays A general processor, a controller, a microcontroller, a microprocessor, and the like may be used for implementation.

The scope of the present disclosure includes software or machine-executable instructions (for example, an operating system, applications, firmware, programs, etc.) that enable operations according to the methods of various embodiments to be performed on a device or computer, and a non-transitory computer-readable medium in which such software or instructions are stored and are executable on a device or computer. A command, which is available to program a processing system for implementing a feature described in the present disclosure, may be stored in a storage medium or in a computer-readable storage medium, and a feature described in the present disclosure may be implemented by using a computer program product including such a storage medium. A storage medium may include a high-speed random-access memory like DRAM, SRAM, DDR RAM or any other random-access solid-state memory device but is not limited thereto and may include one or more magnetic disk storage devices, an optical disk storage device, a flash memory device or a non-volatile memory like a non-volatile solid state storage device. A memory includes selectively one or more storage devices located remotely from a processor or processors. A memory or a non-volatile memory device(s) within the memory includes a non-transitory computable-readable storage medium. A feature described in the present disclosure may be stored in any one of machine-readable media to control the hardware of a processing system, and the processing system may be integrated with software and/or firmware configured to interact with another mechanism utilizing a result of an embodiment of the present disclosure. Such software or firmware may include an application code, a device driver, an operating system and an execution environment/container but is not limited thereto.

What is claimed is:

1. A method of controlling key relay in a quantum key distribution network (QKDN), the method comprising, by a SOFTWARE-DEFINED NETWORKING (SDN) controller: receiving, by a first control entity, a key relay route request from a key management (KM) layer; determining, by the first control entity, whether or not key relay is associated with a plurality of resource groups; and transmitting a key relay route request from the first control entity to a second control entity, when key relay is associated with the plurality of resource groups, wherein key relay route information produced by the second control entity is provided to the KM layer, wherein the key relay route request from the KM layer is based on a request from a cryptographic application, and the method further comprises supplying a key corresponding to the request to the cryptographic application, for performing encoded communication by the cryptographic application between remote parties.

2. The method of claim 1, wherein, when key relay is not associated with the plurality of resource groups, key relay route information produced by the first control entity is provided to the KM layer.

3. The method of claim 1, wherein no key relay is needed, a key is supplied from the KM layer to the cryptographic application.

4. The method of claim 1, wherein key relay is performed on a first key relay route based on the key relay route information which is provided to the KM layer.

5. The method of claim 4, wherein a key is supplied from the KM layer to the cryptographic application.

6. The method of claim 4, further comprising determining, by the first control entity, whether or not there is a reroute path, when rerouting for the key relay is determined.

7. The method of claim 4, wherein the rerouting for the key relay is determined based on an alarm from one or more of a quantum layer and the KM layer.

8. The method of claim 6, wherein, when the reroute, path exists, reroute information is provided to the KM layer, and wherein, when the reroute, path does not exist and reroute is associated with the plurality of resource groups, a reroute request is transmitted from the first control entity to the second control entity, and reroute information produced by the second control entity is provided to the KM layer.

9. The method of claim 6, wherein, when the reroute path does not exist and key relay is not associated with the plurality of resource groups, reroute information produced by the first control entity is provided to the KM layer.

10. The method of claim 6, wherein key relay is performed on a second key relay route based on the reroute information which is provided to the KM layer.

11. The method of claim 1, wherein the plurality of resource groups comprises a first resource group associated with the first control entity and a second resource group associated with the second control entity.

12. The method of claim 1, wherein the resource group is defined based on one or more of target, region, subnetwork and function.

13. The method of claim 1, wherein the first control entity has a hierarchical structure relative to the second control entity.

14. The method of claim 1, wherein the QKDN comprises a quantum layer, the KM layer, a QKDN control layer, a QKDN management layer and a service layer, wherein the QKDN control layer comprises the first control entity and the second control entity, and wherein the service layer comprises the cryptographic application.

15. A SOFTWARE-DEFINED NETWORKING (SDN) controller for controlling key relay in a quantum key distribution network (QKDN), the SOFTWARE-DEFINED NETWORKING (SDN) controller comprising: N control entities (N is an integer equal to or greater than 1), wherein a first control entity comprises a key relay route request management unit which is configured to receive a key relay route request from a key management (KM) layer, to determine whether or not key relay is associated with a plurality of resource groups, and to transmit a key relay route request to a second control entity, when the key relay is associated with the plurality of resource groups, and wherein key relay route information, which is produced by a route information production unit comprised in the second control entity, is provided from the second control entity to the KM layer, wherein the key relay route request from the KM layer is based on a request from a cryptographic application, and a key corresponding to the request is supplied to the cryptographic application, for performing encoded communication by the cryptographic application between remote parties.

16. The SOFTWARE-DEFINED NETWORKING (SDN) controller of claim 15, wherein, when key relay is not associated with the plurality of resource groups, key relay route information, which is produced by a route information production unit comprised in the first control entity, is provided to the KM layer.

17. The SOFTWARE-DEFINED NETWORKING (SDN) controller of claim 15, wherein, when rerouting for the key relay is determined by a rerouting management unit comprised in the first control entity, the rerouting management unit is configured to determine whether or not there is a reroute path.

18. The SOFTWARE-DEFINED NETWORKING (SDN) controller of claim 17, wherein, when the reroute path exists, reroute information is provided to the KM layer, and wherein, when the reroute path does not exist and reroute is associated with the plurality of resource groups, a reroute request is transmitted to the second control entity by a rerouting management unit comprised in the first control entity, and reroute information, which is produced by a reroute information production unit comprised in the second control entity, is provided to the KM layer.

19. The SOFTWARE-DEFINED NETWORKING (SDN) controller of claim 17, wherein, when the reroute path does not exist and key relay is not associated with the plurality of resource groups, reroute information, which is produced a route information production unit comprised in the first control entity, is provided to the KM layer.

* * * * *